(12) United States Patent
Harato et al.

(10) Patent No.: US 8,723,636 B2
(45) Date of Patent: May 13, 2014

(54) PTC DEVICE

(75) Inventors: Kenji Harato, Tagata-gun (JP); Arata Tanaka, Ryugasaki (JP)

(73) Assignee: Tyco Electronics Japan G.K., Kawasaki (JP)

( * ) Notice: Subject to any disclaimer, the term of this patent is extended or adjusted under 35 U.S.C. 154(b) by 163 days.

(21) Appl. No.: 13/128,223

(22) PCT Filed: Nov. 6, 2009

(86) PCT No.: PCT/JP2009/068999
§ 371 (c)(1),
(2), (4) Date: Aug. 4, 2011

(87) PCT Pub. No.: WO2010/053158
PCT Pub. Date: May 14, 2010

(65) Prior Publication Data
US 2011/0279220 A1   Nov. 17, 2011

(30) Foreign Application Priority Data
Nov. 7, 2008   (JP) ................................. 2008-286737

(51) Int. Cl.
*H01C 7/13*   (2006.01)

(52) U.S. Cl.
USPC ....................................................... 338/22 R

(58) Field of Classification Search
USPC ....................................................... 338/22 R
See application file for complete search history.

(56) References Cited

U.S. PATENT DOCUMENTS

| | | | | |
|---|---|---|---|---|
| 3,940,591 A | * | 2/1976 | Ting .............................. | 219/544 |
| 4,210,800 A | * | 7/1980 | Van Bokestal et al. ....... | 219/544 |
| 4,395,623 A | * | 7/1983 | Shimada et al. .............. | 219/544 |
| 4,401,885 A | * | 8/1983 | Ishii et al. ..................... | 219/523 |
| 4,733,057 A | * | 3/1988 | Stanzel et al. ................ | 219/548 |
| 6,259,157 B1 | * | 7/2001 | Sakamoto et al. ............ | 257/723 |
| 6,656,304 B2 | * | 12/2003 | Furuta et al. .................. | 156/216 |
| 8,164,414 B2 | * | 4/2012 | Tanaka et al. ................ | 338/22 R |
| 2011/0279220 A1 | * | 11/2011 | Harato et al. ................ | 338/22 R |

FOREIGN PATENT DOCUMENTS

| | | |
|---|---|---|
| JP | 61-057502 U | 9/1984 |
| JP | 02-147827 A | 11/1988 |
| JP | 02-147827 A | 6/1990 |
| JP | 4-162701 A | 6/1992 |
| JP | 3007342 U | 2/1995 |
| JP | 11-330317 A1 | 11/1999 |
| JP | 2001-196202 A2 | 7/2001 |
| JP | 2006-344872 A | 12/2006 |
| JP | 2008-071828 A | 3/2008 |

OTHER PUBLICATIONS

International Search Report for International Application No. PCT/JP2009/068999 (in English).

* cited by examiner

*Primary Examiner* — James Harvey

(57) ABSTRACT

There is provided a PTC device having a sufficient function to detect the possibility of the substrate reaching an extraordinary high temperature more rapidly, and prevent the substrate from reaching such an extraordinary high temperature beforehand. The PTC device 10 includes a layered support 14 that functions as a heat transfer medium and a polymer PTC element 12 disposed thereon wherein the polymer PTC element is disposed on one surface 15 of the layered support (in a thermally connected condition) and the polymer PTC element and the layered support are molded in a resin such that the other surface 15' of the layered support is exposed.

11 Claims, 4 Drawing Sheets ic # PTC DEVICE

FIELD OF THE INVENTION

The present invention relates to a PTC device having a PTC element, particularly a polymer PTC element and an electrical apparatus having such a PTC device.

BACKGROUND OF THE INVENTION

A polymer PTC element has a property of rapidly increasing in its resistance value in order for example to prevent an electrical apparatus from overheating or causing a trouble due to an excess current, for example, when the temperature of the PTC element exceeds a given critical value, that is, it has a positive temperature coefficient property or a PTC property. Such a critical temperature is referred to as the "trip temperature."

A substrate, onto which an IC chip is mounted, and which is arranged in an electrical apparatus generally has a radiator plate for dissipating heat to its outside which heat is generated with use of the electric apparatus. In a case where such a substrate reaches an extraordinary high temperature due to some reasons, for example, due to allowing an excess current to flow through the substrate, the dissipation of the heat through the radiator plate may not be sufficient, so that it happens that the radiator plate and thus the substrate reach and remain at an extraordinary high temperature. Thereupon, it has been adopted to attach a ceramic PTC element (for example, POSISTOR (registered trademark) manufactured by Murata Manufacturing Co., Ltd., Japan) to the radiator plate, thereby detecting the temperature of the substrate and indirectly preventing the substrate from reaching an extraordinary high temperature.

Japanese Patent Laid-open Publication No. 04-162701 is a prior patent reference.

SUMMARY OF THE INVENTION

Although such a ceramic PTC element has a function to prevent the substrate from reaching an extraordinary high temperature, such function is not necessarily sufficient for some cases. For example, an increase of the resistance value with time during temperature increase is not so large, that is, the resistance value does not sharply increase in a short time, so that such a ceramic PTC element sometimes fails to interrupt the current in a sufficiently short time. Therefore, there is generally adopted a method in which the current is interrupted not by the PTC element, but by an indirect method when the resistance of the ceramic PTC element reaches a predetermined value. Particularly, it is desired to detect the possibility of the substrate reaching an extraordinary high temperature more rapidly, and directly and beforehand prevent the substrate from reaching such an extraordinary high temperature.

With regard to the above problem, extensive studies have been made, and it has been found that the above problem can be solved by a PTC device which is formed by using a polymer PTC element and further subjecting the element to molding in a condition where the PTC element is supported on a support.

Accordingly, in a first aspect, the present invention provides a PTC device comprising a layered (or laminar) support that functions as a heat transfer medium and a polymer PTC element disposed on the support, wherein the polymer PTC element is disposed on one surface of the layered support (in a thermally connected state), and the PTC element and the layered support are molded in a resin such that the other surface of the layered support is exposed.

In the PTC device of the present invention, the PTC element is molded in the resin. As a result, the molded PTC element is isolated from the circumstance of the PTC device by the molded resin. For example, it is capable of preventing the PTC element from being adversely affected by moisture, oxygen and/or the like as much as possible which exists around the device. Thus, it is particularly preferable that the molded resin has a barrier function against moisture, oxygen and the like.

The layered support is capable of thermally contacting with an object, the temperature of which is to be detected by the PTC device. The term "thermally contact(ing)" means that the exposed surface of the layered support is such that it contacts with a surface of the object, thereby heat is rapidly conducted from the object to the exposed surface of the layered support. As a result of such a thermal contact, the exposed surface of the layered support preferably becomes to have a temperature which is substantially equal to that of the surface of the object. As a result of such thermal contact, the exposed surface of the layered support more preferably becomes to have a temperature which is substantially equal to that of the surface on the opposite side (not exposed side) of the layered support.

It is preferable to use a thermally conductive material, in particular a material having an excellent thermal conductivity, for example, a metallic material such as stainless steel, copper and the like as a material that forms such a layered support. It is also capable of using a material having less excellent thermal conductivity, for example, a composite material such as a glass-epoxy material (so-called a "gla-epo" material, i.e. a glass fiber reinforced epoxy resin material) and the other ceramic materials, when it has a relatively thin thickness, which leads to a not so large resistance against the thermal conduction.

The polymer PTC element is thermally connected with the layered support. As a result, there is provided a construction wherein heat is conducted, preferably rapidly conducted from the exposed surface of the layered support, and therefore from the object on which the PTC device is disposed through the layered support to the PTC element. Thus, the expression that the layered support "functions as a heat transfer medium" is used in the present specification in the sense that heat is conducted from the object to the PTC element. It is noted that the polymer PTC element may directly or indirectly be connected to the layered support.

The directly connected condition of the polymer PTC element to the layered support corresponds to an embodiment wherein no material intervenes therebetween and the indirectly connected condition thereof corresponds to an embodiment wherein some material intervenes therebetween. Such other material includes an adhesive material (such as an adhesive, a solder, an electrically conductive adhesive, an electrically conductive paste and the like) and an electrically insulating material and the like, and such a material usually exists in the form of a layer.

As readily seen from the above, the layered support is connected with the PTC element via a thermally conductive material, in particular a material having an excellent thermal conductivity such as a metallic material in the case of the indirectly connected condition. It is also capable of using a material having less excellent thermal conductivity, for example, a ceramic material, when it has a relatively thin thickness, which leads to a not so large resistance against the heat transfer.

In a second aspect, the present invention provides a method of manufacturing a PTC device comprising a layered support and a polymer PTC element disposed thereon, the method comprising the steps of disposing the polymer PTC element on one surface of the layered support; and subjecting the layered support and the polymer PTC element to molding such that the other surface of the layered support is exposes. According to the above manufacturing method, the above-mentioned present PTC device can be produced. It is noted that the polymer PTC element may be directly or indirectly disposed on the layered support similarly to the connection of the above mentioned polymer PTC element to the layered support.

In a third aspect, the present invention provides an electrical apparatus which comprises the above-mentioned PTC device. For example, such an electrical apparatus includes a circuit board, in particular an IC substrate for a power control circuit, a circuit module, an overheat detector and the like each of which comprises the present PTC device.

The present PTC device is manufactured by combining the polymer PTC element that has a superior sensitivity to the ceramic PTC element with the layered support and subjecting them to molding in a manner that one surface of the support is exposed. As a result, a temperature increase of the object is rapidly conducted to the polymer PTC element and then the PTC element can actuate depending on the temperature increase when the PTC device is disposed on the object in a manner that the exposed surface of the layered support is contacted with the object, an abnormally temperature which is to be detected. That is, the superior sensitivity of the polymer PTC element can be effectively used because the increase of the temperature can be rapidly conducted from the object to the polymer PTC element.

Figure 1:
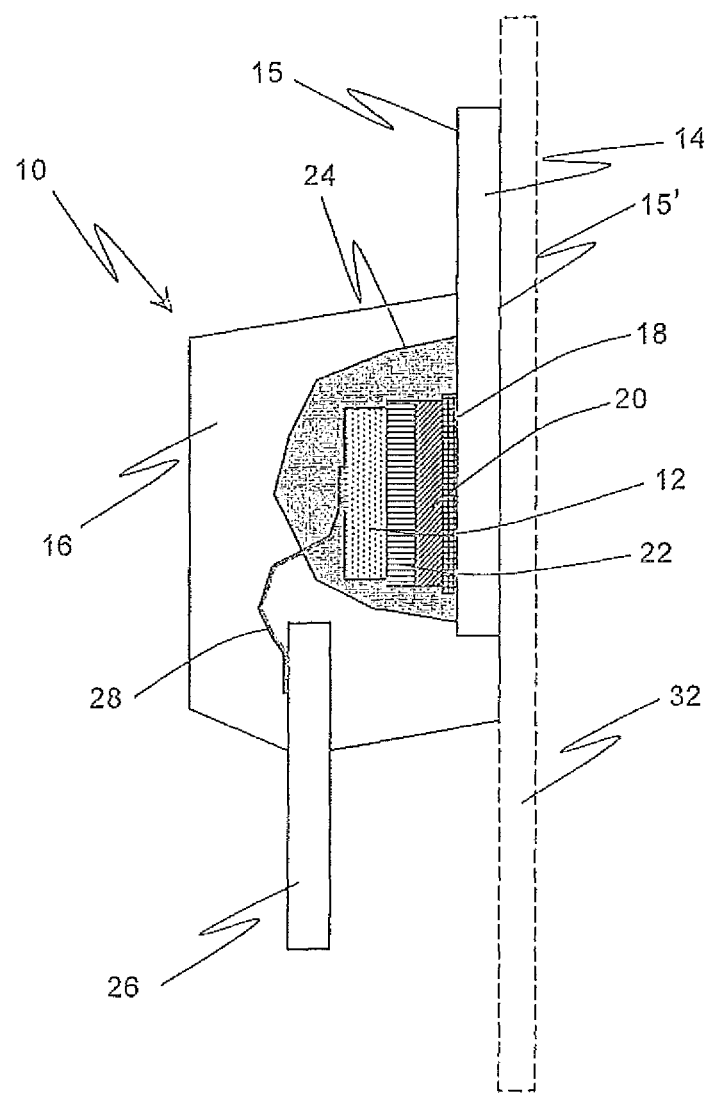
FIG. 1 shows a schematic cross section of the PTC device of the present invention.

The element reference numbers are:
10: PTC device; 12: PTC element; 14: layered support;
15, 15': main surfaces; 16: molded resin;
18: solder material layer; 20: insulating material layer;
22: silver paste layer; 24: potting element;
26, 26': lead; 28, 28': wire; 30: opening; 32: object.

DETAILED DESCRIPTION OF THE INVENTION

The polymer PTC element that constitutes the PTC device of the present invention is well known and various types of elements are commercially available. Such a polymer PTC element is used herein as an article that has a generally used meaning. The polymer PTC element comprises a polymer PTC component having a laminar structure that is formed from a so-called polymer PTC composition, and preferably comprises each of a first metallic electrode (particularly a metal foil electrode) and a second metallic electrode (particularly a metal foil electrode) disposed on each of the both surfaces of the PTC element, respectively. The polymer PTC component is made of a so-called electrically conductive polymer composition, wherein an electrically conductive filler, for example, a carbon filler, a metallic filler (including a filler of copper, nickel and an alloy of nickel-cobalt or the like) is dispersed in a polymeric material (for example, polyethylene, polyvinylidene fluoride or the like). The PTC component may be obtained by extruding such a composition.

As the layered support, any material may be used as long as it is defined by two opposing main surfaces, and can be directly or indirectly disposed on one main surface of the PTC element as a thermally conductive material for the polymer PTC element. Specifically, a metal layer, for example, a metal sheet or a metal film may be used as the layered support. In one embodiment, a material which is the same as that of a metallic lead frame (for example, stainless steel or the other appropriate metal material) that is used in a wiring substrate. In an alternative embodiment, the layered support may be made of a ceramic material. It is preferable that the layered support has a larger surface than an occupying area of the PTC element which is disposed thereon. That is, it is preferable that a portion of the layered support extends outside at least along a portion of a periphery of the PTC element, and preferably a whole periphery of the PTC element when disposing the PTC element on the layered support and seeing the PTC element from its above.

In the case where the layered support is made of an electrically conductive material upon disposing the polymer PTC element on the layered support, it is necessary to dispose an electrically insulating material between the PTC element and the layered support. In the case where the layered support is made of an electrically insulative material, it is not necessary to dispose such an electrically insulating material therebetween. It is preferable that the electrically insulating material has a laminar structure.

In the case where the electrically insulative material intervenes therebetween, a layer of the electrically insulative material is bonded to the layered support with an adhesive material and a PTC element is bonded to the layer of the electrically insulative material with an adhesive material. These adhesive materials, which may be the same or different, and preferably have a thermal conductivity, more preferably an excellent thermal conductivity. For example, a solder, an electrically conductive adhesive, an electrically conductive paste (such as a silver paste), a solder paste, an electrically conductive adhesive and the like may be used for such bonding.

In the present PTC device, the PTC element and the layered support are subjected to molding such that the other surface of the layered support (i.e. the surface where the PTC element is not disposed) is exposed. Upon molding, the layered support onto which the PTC element has been disposed is set in a predetermined mold in a condition where the other surface of the layered support is exposed and then a resin is injected into the mold, and thereafter the resin is hardened and/or cured.

The resin to be injected, that is the molded resin, is a curable resin, for example, a thermosetting resin or a photo- or radiation-curable resin, and for example, various epoxy resins or silicone resins and the like may be used. In other embodiment, the resin to be injected may be a thermoplastic resin. In this case, the resin in a molten state is injected into the mold and then it is hardened by cooling. The above mentioned molding process itself is well-known and the molding process is performed so that at least a portion, preferably a most portion, and more preferably substantially the whole of the other surface of the layered support is exposed. The molded resin has a function that the PTC element being molded is isolated from the circumstance of the PTC device. Specifically, it prevents the PTC element from being adversely affected by moisture, oxygen or the like as much as possible which exists around the PTC device.

In a particularly preferred embodiment of the present invention, the PTC element disposed on the layered support is surrounded beforehand by subjecting to resin potting using a curable resin followed by hardening the curable resin, thereby a potting element is formed and thereafter the potting element is subjected to the molding. In this context, the term potting means a procedure of covering an element with a resin by so-called "resin heaping (or resin-heap coating)", followed by hardening the covering or coating resin. Usually, the curable resin is heaped onto the PTC element that is disposed on the layered support and hardened. The heaping of the curable resin is performed so that the whole of the PTC element disposed on the layered support is covered with the resin. As a result, the PTC element is coated with the hardened resin on the layered support, that is, the coating enclosing the PTC element is formed as the potting element. It is naturally appreciated that at least a portion of the other surface of the layered support should be remained in the exposed state during the potting procedure. Therefore, the potting procedure may be referred to as a procedure, while maintaining a portion of the layered support exposed, to encapsulate the other portion of the layered support. It is noted that in order to flow current through the PTC element, a wire(s) (or a wiring(s)) connected to the PTC element is required to extend outwardly through the potting element. In this way, the PTC element disposed on the layered support is coated with the potting element, followed by performing the molding.

In the case where the PTC element coated with the potting element is subjected to the molding, a hot resin that is molten or softened is introduced into the mold in which the above PTC element is disposed. In this case, the hot resin does not contact directly with the PTC element, so that the thermal influence given to the PTC element by the hot resin is buffered.

Specifically, in the case where a polyethylene (PE), which has a melting point in the range for example from 180° C. to 240° C., is used as the resin for the PTC element, for example, and a hot epoxy resin in a liquid state at a temperature of about 180° C. is introduced into the mold as the resin for molding the element, so that the potting element intervenes between the PTC element and the mold resin. As a result, the potting element functions as an insulating material against the thermal influences from the hot liquid to the PTC element.

In addition to or instead of buffering function as to the above-mentioned thermal influences, when the molded resin, in particular the resin in a condition being injected into the mold has a possibility to adversely and chemically affect the PTC element, the potting element can function as a buffering material to inhibit such an adverse influence to the PTC element. For example, the polymer such as PE, which constitutes the PTC component, may deteriorate or degrade by the influence of an organic solvent or oil. The potting element prevents the PTC element from directly contacting as much as possible with a chemical component (for example, a curing agent) contained in the molten and/or softened resin being poured into the mold during the molding process.

In connection with the above, the curable resin which forms the potting element may be any of suitable curable resins. For example, the thermosetting resins (for example, an epoxy resin, a silicone resin and the like) are preferable. In other embodiment, the curable resin which forms the potting element may be a photo- or radiation-curable resin. In the case where the resin being used for the molding is a curable resin, such a curable resin is a resin different from the curable resin that forms the potting element. As the curable resin that forms the potting element, it is preferable to use a resin having a coefficient of linear expansion after being cured larger than that of the molded resin at a trip temperature of the PTC element. In addition, it is preferable for the curable resin for the potting element after being cured to have a coefficient of linear expansion which is equal to or less than that of the polymer in the PTC component that forms the PTC element.

Generally, it is preferable that the resin which forms the potting element has a coefficient of linear expansion not less than $3.0 \times 10^{-5}/°$ C. and not more than $40.0 \times 10^{-5}/°$ C., particularly not more than $30.0 \times 10^{-5}/°$ C. at a temperature higher than Tg (glass transition temperature) after being cured. The coefficient of linear expansion of the resin after being cured is, for example, in the range from $10 \times 10^{-5}/°$ C. to $20 \times 10^{-7}/°$ C. In the case where the polymer forming the polymer PTC element is a polyethylene, it is especially preferable that the resin after being cured has a coefficient of linear expansion within the above mentioned range. For example, in the case where the resin forming the potting element is an epoxy resin, it is preferable to have a coefficient of linear expansion not less than $3.0 \times 10^{-5}/°$ C. and not more than $40 \times 10^{-5}/°$ C. after being cured at a temperature around the trip temperature of the PTC element.

When the polymer PTC component of the PTC element thermally expands as the temperature of the PTC element increases, the force generated by the volumetric increase due to the expansion of the PTC component will compress the periphery of the PTC element. As a result, the force generated by the expansion of the element becomes to balance with the force generated by the volumetric decrease of the periphery of the PTC element due to being compressed. Therefore, in the case where the molded material located around the PTC element is comparatively hard, that is, the mold material slightly expands with increasing temperature (i.e., in the case where the material has a small coefficient of linear expansion), it is conceivable that the PTC component cannot sufficiently expand, thereby the PTC property may be adversely affected. For example, it may happen that the PTC element fails to reach a sufficiently high resistance upon tripping.

In this case, when a relatively soft material intervenes between the PTC element and the molded material, such a soft material surrounds the PTC component, so that the PTC component can easily expand. Such a soft material has a comparatively large coefficient of linear expansion. Therefore, when a material having a larger coefficient of linear expansion is used as the potting element, it prevents the PTC component from suppressing the expansion thereof, and as a result, it contributes to preserve the property as the PTC element as much as possible. For example, when a PTC device using a PTC component comprising the potting element is compared with a PTC device using a PTC component without the potting component, an R-T (Resistance to Temperature) characteristic of the former PTC device showed twice to fourfold resistance value after the PTC component is tripped due to the thermal expansiont (see FIG. 5 which will be referred to below).

Therefore, in the PTC device of the present invention, it is particularly preferable that the molded material has a coefficient of linear expansion which is smaller than that of the potting element. It is preferable that such relationship of the coefficients of linear expansion is satisfied at a temperature at least around the trip temperature of the PTC element, preferably at a temperature in the range of the trip temperature±20° C., more preferably at a temperature in the range of the trip temperature±10° C., for example, at a temperature in the range of the trip temperature±5° C.

Figure 2:
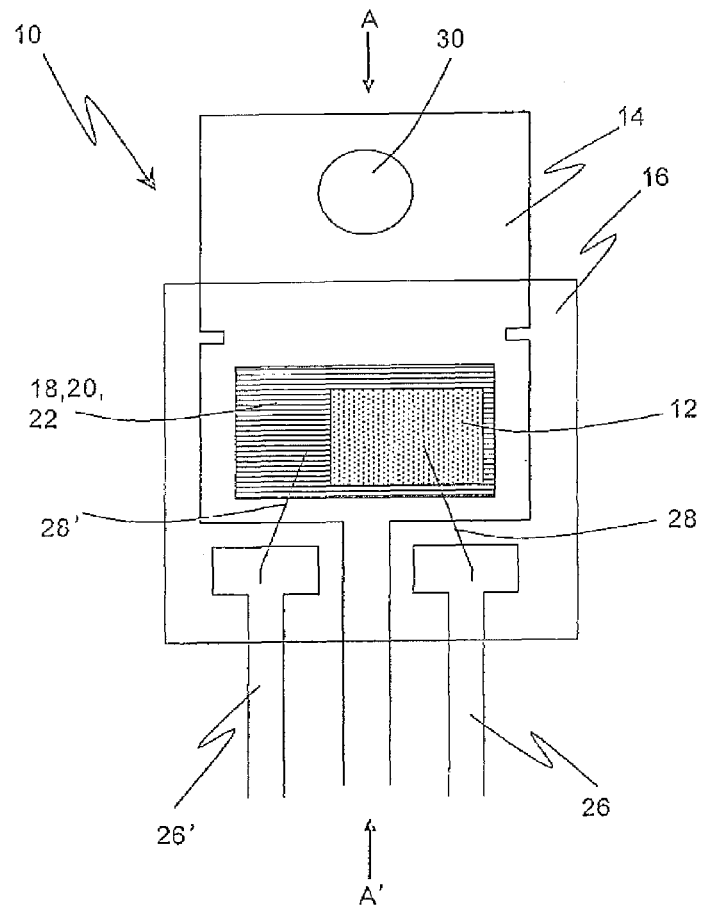
FIG. 2 shows a schematic plan view of the PTC device shown in FIG. 1 when seen the device from the left side of FIG. 1.

Then, the PTC device of the present invention is explained in more detail with reference to the drawings. FIG. 1 shows a schematic cross-sectional view of the PTC device of the present invention. Moreover, a side-view of the PTC device in FIG. 1 seen from the left side of FIG. 1 is shown in FIG. 2 as a schematic plan view, such that the state of the PTC element that is positioned within the molded resin can be understood. As can be easily understood, a cross section taken along a line that horizontally passes through FIG. 2 at the center (the line which connects arrows A-A' in FIG. 2) corresponds to the view of FIG. 1.

The PTC device 10 of the present invention comprises the polymer PTC element 12 and the layered support 14. The layered support 14 has two main surfaces, that is, a main surface 15 (referred to as one surface) and a main surface 15' (referred to as the other surface), opposing to each other, and the PTC element 12 is located on one main surface 15. In the present PTC device 10, the main surface 15' is the surface which is to be exposed. The main surface 15' functions as a surface to be contacted with an object 32, an abnormal condition (for example, an extraordinary high temperature, an excess current or the like) of which should be detected. As a result of such detection, the PTC element 12 trips depending on the abnormal condition.

At least a portion of the main surface 15', preferably a most portion of the main surface 15', and more preferably substantially a whole of the main surface 15' as shown in FIG. 2 contacts with the object 32 (which is not shown in FIG. 2). Heat is rapidly conducted from the object 32 to the PTC device 10 through the layered support 14 by such contact.

In the illustrated embodiment, an electrical insulation material layer (for example, a ceramic material layer, a glass-epoxy material layer, a layer of a resin which can be used for the above-mentioned molding or the like) 20 exists between the PTC element 12 and the layered support 14. When the layered support 14 is made of an electrically conductive material, it is useful that the electrical insulation material layer intervenes as mentioned above. The layered support 14 is connected to the electrical insulation material layer 20 via a solder material layer 18, and a silver paste layer 22 exists between the electrical insulation material layer 20 and the PTC element 12. Therefore, in the illustrated embodiment, the PTC element 12 is indirectly connected to the layered support 14, thereby both layers being indirectly thermally contacted with each other. Each of these layers, which exist between the PTC element 12 and the layered support 14, is made of a material having a thermal conductivity, preferably a good thermal conductivity.

In the illustrated embodiment, there is provided a potting element 24 so as to cover the PTC element 12 and the above-mentioned layers (18, 20 and 22) which are located on the layered support 14. It is noted that to the upper side of the PTC element 12 (that is, one metallic electrode of the PTC element), a wire 28 is connected at one end thereof, which wire extends through the potting element 24 outwardly. The other end of the wire 28 is connected to a lead 26. To the lower side of the PTC element 12 (that is, the other metallic electrode of the PTC element), a wire 28' is connected at one end thereof through the silver paste layer 22, which wire extends through the potting element 24 outwardly. The other end of the wire 28' is connected to a lead 26'. The lead 26' and the wire 28' are not illustrated in FIG. 1 for the ease of understanding.

The PTC element 12 located on the layered support 14 is molded as mentioned above, so that the mold resin 16 coats the PTC element 12 and the various layers located therebelow. As illustrated, the molded resin 16 does not coat the other surface 15' of the layered support 14, thereby exposing the other surface 15'. That is, the PTC device of the present invention in which the PTC element 12 is molded in the resin 16 is obtained. It is noted that the layered support 14 has an opening 30 for a screw so that the PTC device can be screwed when it is fixed on the object.

The PTC device 10 of the present invention illustrated in the above is manufactured by placing the PTC element 12 directly or indirectly on the layered support 14 at first, and then by wire bonding each of the wires 28 and 28' between the PTC element 12 and each of the leads 26 and 26', respectively. Optionally, the resin is heaped by potting followed by hardening it, and thereby forming the potting element 24. Thus, an assembly is obtained which comprises the PTC element 12 connected to the lead 26 disposed on the layered support 14. Then, the obtained assembly is molded so that the PTC device 10 of the present invention, which is molded in the resin 16, can be obtained.

It is noted that in the manufacturing of the present PTC device, it is convenient to provide a lead frame beforehand, in which the layered support 14 and leads 26 and 26' are originally integrated, and to perform wire bonding to connect each of the wires 28 and 28' and to separate thereafter the leads from the layered support as illustrated. It is also a useful method to directly connect each of the leads 26 and 26' to the upper surface and the lower surface of the PTC element, respectively without performing the wire bonding.

Example 1

The PTC device of the present invention was manufactured as explained below. PTC element: Two kinds of PTC elements were obtained by extruding an electrically conductive polymer composition containing polyethylene (PE, 46% by weight) and carbon black (54% by weight) to produce an extrudate, to both opposite main surfaces of which a first and a second metal electrodes (nickel-plated copper foils) were thermal compression bonded. These PTC elements had a trip temperature (Tr) of 95° C. and 125° C., respectively. Then, each metal electrode of the PTC elements was plated with gold (plating thickness: not larger than 0.03 micrometers). The PTC elements had the sizes of 1.6 mm×0.8 mm×0.3 mm (thickness) for the element having the Tr of 95° C. and of 3.2 mm×2.5 mm×0.3 mm (thickness) for the element having the Tr of 125° C.

The PTC element was disposed on a lead frame made of a copper-tin alloy with a nickel primer plating and a silver plating thereon (which was formed by plating the alloy frame with nickel followed by plating with silver thereon); and the lead frame corresponded to the layered support having a thickness of 1.3 mm. Upon disposing, an electrically insulating ceramic substrate (Tn/Ni, 0.6 mm in thickness) of 5 mm×3 mm as the insulating material layer was soldered (M705, Senju Metal Industry Co., Ltd.) to the lead frame, and the above PTC element was fixed thereon with a silver paste (DBC 130SD, manufactured by Panasonic Corporation), followed by hardening the paste by maintaining a condition at a temperature of 150° C. for 10 minutes. In this way, the PTC element 12 was mounted on the layered support 14 via the solder material layer 18, the insulation material layer 20, and the silver paste layer 22 as the adhesive material as shown in FIG. 1.

Then, the top surface of the PTC element was wire-bonded to one end of the lead 26, and the silver paste layer 22 on the ceramic insulating substrate was wire-bonded to one end of the lead frame 26' using aluminum wires 28 and 28' (diameter: 150 μm) as shown in FIG. 2, and thereby electrically connecting the PTC element to the lead frame to obtain an assembly comprising the PTC element 12 being disposed on the layered support 14.

Next, an epoxy resin (Epoxy) (EPIFORM K-8908, manufactured by SOMAR Corp.) 24 was potted onto the above assembly so as to coat the PTC element 12 and its underlying layers of the obtained assembly, and then the epoxy resin was hardened at a temperature of 80° C. for 7 hours, thereby the PTC element 12 and the underlying layers disposed on the layered support being coated with the potting element 24 as shown in FIG. 1 to obtain a precursor of the PTC device.

Then, the precursor was attached to an injection mould such that the surface 15' of the lead frame, on which no PTC element being disposed, was exposed, and a molten molded resin (epoxy resin, Sumikon EME6200, manufactured by Sumitomo Bakelite Co, Ltd,) was poured therein, followed by being temporarily hardened at a temperature of 180° C. for 3 minutes. After such temporary hardening, the assembly was removed from the mold and subjected to deburring. Then, the assembly was maintained at a temperature of 175° C. for 8 hours to cause the mold resin 16 to be permanently hardened, and thereby the PTC devices 10 of the present invention (one PTC device using a PTC element having the trip temperature (Tr) of 95° C. and the other PTC device using a PTC element having the trip temperature (Tr) of 125° C.)) as shown in FIG. 1 were obtained.

Example 2

The procedure of Example 1 was repeated except that the potting element was formed using other epoxy resin (EPIFORM R-2101, manufactured by SOMAR Corp.), and then no molding was carried out, so that the precursor of the PTC device of the present invention having the potting element was obtained. In this example, the PTC element having the Tr of 95° C. was used.

Example 3

The procedure of Example 2 was repeated except that the potting element was formed using other epoxy resin (SOMAKOTE KZ-106, manufactured by SOMAR Corp.), so that the precursor of the PTC device of the present invention having the potting element was obtained. In this example, the PTC element having the Tr of 95° C. was used.

Example 4

The procedure of Example 2 was repeated except that the potting element was formed using other epoxy resin (SOMAKOTE KZ-107, manufactured by SOMAR Corp.), so that the precursor of the PTC device of the present invention having the potting element was obtained. In this example, the PTC element having the Tr of 95° C. was used.

Example 5

The procedure of Example 1 was repeated except that a silicone resin (Silicone) (KE-1867, manufactured by Shin-Etsu Polymer Co. Ltd.) was used. In this example, the PTC element having the Tr of 95° C. was used.

Example 6

The procedure of Example 1 was repeated to obtain the PTC device of the present invention. In this example, the present PTC device was obtained without forming the above-mentioned potting element. The PTC element used had the Tr of 125° C.

(1) Confirmation of PTC Properties

The resistances of each of the various PTC devices and the precursors thereof, which were obtained as mentioned above, were measured as follows:

The temperature around the PTC device or the precursor was raised by 5° C. at a time, and that temperature was kept for 10 minutes thereafter, and then the resistance of the device or precursor was measured; such temperature raising and keeping was repeated; and thereby the resistance (R)-temperature (T) property of the PTC device or the precursor was evaluated. The temperature of the measurement was carried out within the range from 20° C. to 160° C.

It is noted that the resistance was obtained by measuring the resistance value between two leads. In addition to these PTC devices and the precursors thereof, the same measurement of the resistance was performed on a PTC element itself (which had no potting element and also which was not subjected to molding) and an inorganic PTC element (POSISTOR (registered trademark) manufactured by Murata Manufacturing Co., Ltd., Japan, which element detects a temperature of 125° C.) as a comparative example.

Figure 3:
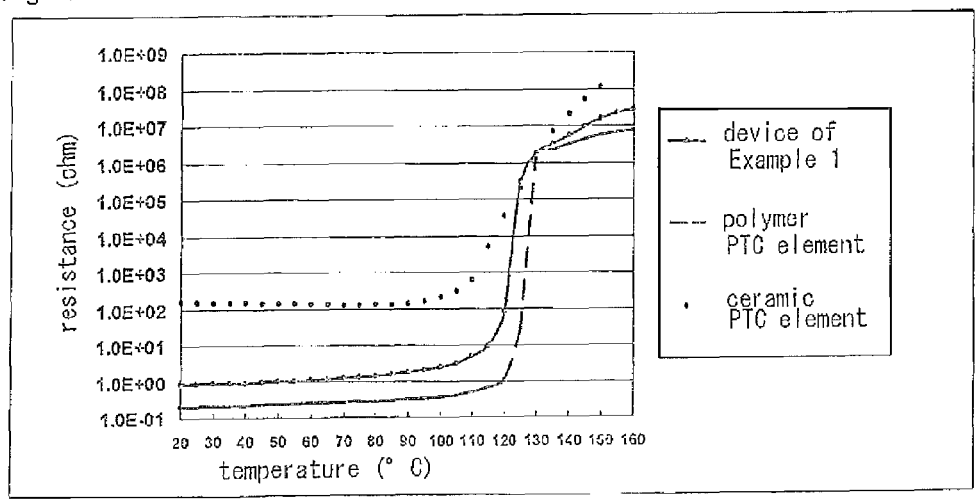
FIG. 3 shows a result of Resistance-Temperature measurement of the present PTC device in Example 1.
Figure 4:
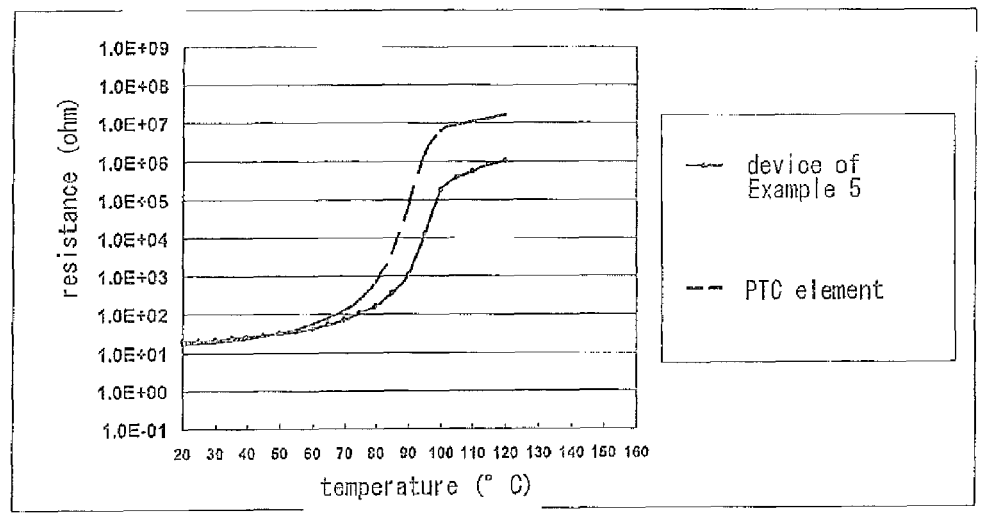
FIG. 4 shows a result of Resistance-Temperature measurement of the present PTC device in Example 5.
Figure 5:
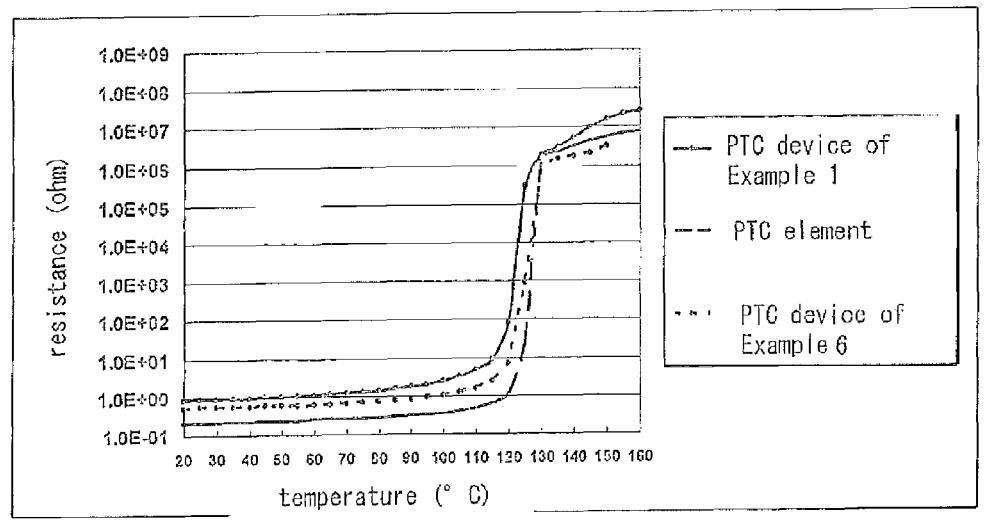
FIG. 5 shows a result of Resistance-Temperature measurement of the present PTC device in Example 6.

The results of the measurement are shown in Tables 1 and 2 below. It is noted that in the Tables, each value of the glass transition temperature (Tg), a coefficient of linear expansion at a temperature T higher than Tg (T>Tg), and a coefficient of linear expansion at a temperature T lower than Tg (T<Tg) of the resin after being hardened (except for PE) is also shown. With regard to the measurements of the devices of Example 1 (which used the PTC element having Tr of 125° C.), Examples 5 and 6, the results are shown in FIGS. 3 to 5.

TABLE 1

| | R-T Properties (including properties of resin which forms potting element and molded material) | | | | | | |
|---|---|---|---|---|---|---|---|
| No. | PTC element Tr = 95° C. | Example 1 | Example 2 | Example 3 | Example 4 | Example 5 | molded material |
| resin | | Epoxy | Epoxy | Epoxy | Epoxy | Silicone | Epoxy |
| No. of product | | K-8908 | R-2101 | KZ-106 | KZ-107 | KE-1867 | EME6200 |
| trade name | | Epiform | Epiform | Somakote | Somakote | KE-1867 | Sumikon |
| glass transition temperature | PE −30° C. | −3° C. | 120° C. | 90° C. | 55° C. | 150° C. | 160-180° C. |
| coefficient of linear expansion | PE 20.0E−5/ ° C. | 15.0E−5/ ° C. | 17.0E−5/ ° C. | 13.0E−5/ ° C. | 17.5E−5/ ° C. | 20-40E−5/ ° C. | 5.5-7.5E−5/ ° C. |

TABLE 1-continued

R-T Properties (including properties of resin which forms potting element and molded material)

| No. | PTC element Tr = 95° C. | Example 1 | Example 2 | Example 3 | Example 4 | Example 5 | molded material |
|---|---|---|---|---|---|---|---|
| (T > Tg) coefficient of linear expansion | PE 14.0E-5/° C. | 4.0E-5/° C. | 6.5E-5/° C. | 4.5E-5/° C. | 6.0E-5/° C. | — | 1.4-2.0E-5/° C. |
| (T < Tg) hardening conditions | — | 80° C. 7 hr | 100° C. 5 hr | 85° C. 1 hr | 80° C. 45 min | 120° C. 1 hr | 180° C., 3 min 175° C., 8 hr |
| Resistance (@25° C.) | 15.8 Ω | precursor 10.9 Ω device 11.6 Ω | precursor 12.5 Ω | precursor 9.2 Ω | precursor 6.3 Ω | precursor 8.8 Ω device 20.1 Ω | — |
| Resistance (@60° C.) | 34.8 Ω | precursor 29.6 Ω device 24.7 Ω | precursor 34.8 Ω | precursor 26.5 Ω | precursor 19.9 Ω | precursor 23.3 Ω device 43.0 Ω | — |
| Resistance (@100° C.) | 72.3 kΩ | precursor 217 kΩ device 42 kΩ | precursor 2130 kΩ | precursor 124 kΩ | precursor 221 kΩ | precursor 104 kΩ device 176 kΩ | — |

TABLE 2

R-T properties

| No. | PTC element Tr = 95° C. | Example 1 PTC device | Example 6 PTC device (without potting element) |
|---|---|---|---|
| resin | | Epoxy | Epoxy |
| No. of product trade name | | K-8908 Epiform | EME6200 Sumikon |
| glass transition temperature | PE -30° C. | -3° C. | 160-180° C. |
| coefficient of linear expansion (T > Tg) | PE 20.0E-5/° C. | 15.0E-5/° C. | 5.5-7.5E-5/° C. |
| coefficient of linear expansion (T < Tg) | PE 14.0E-5/° C. | 4.0E-5/° C. | 1.4-2.0E-5/° C. |
| hardening condition | — | 80° C. 7 hr | 180° C., 3 min 175° C., 8 hr |
| Resistance (@25° C.) | 0.20 Ω | 0.86 Ω | 0.54 Ω |
| Resistance (@100° C.) | 0.35 Ω | 2.48 Ω | 1.03 Ω |
| Resistance (@130° C.) | 1420 kΩ | 1820 kΩ | 1030 kΩ |

As is evident from the results shown in Table 1, each of the PTC devices, which have the detection temperature of 95° C., showed a very low resistance value at a condition of room temperature (25° C.), showed a not so high resistance value at a temperature of somewhat higher temperature below the trip temperature (60° C.), but showed a very high resistance around the trip temperature, as with the case of the PTC element. This means that the PTC device of the present invention has appropriate characteristics as the PTC element.

As is evident from the results shown in Table 2, in any case where a PTC element having the trip temperature of 125° C. was used, including the case where a PTC element equipped with the potting element was used (Example 1), and the case where a PTC element not equipped with the potting element was used (Example 6), the PTC devices that were subjected to the molding showed a very low resistance value at a condition of room temperature (25° C.), showed a not so high resistance value at a temperature of somewhat higher temperature below the trip temperature (100° C.), but showed a very high resistance around the trip temperature as with the cases of the PTC elements. This means that the PTC device of the present invention has appropriate properties as the PTC element. From these results, the resistance value of Example 6, wherein the PTC element was not subjected to the potting process (that is, without a potting component) at the tripping was so low as the half value of that of Example 1, wherein the PTC element was subjected to the potting process, so that it is presumed that the potting process may affect the expansion of the PTC element by somewhat an extent.

FIG. 3 shows the result of Resistance-Temperature measurement of the present PTC device in Example 1 (using the PTC element having Tr of 125° C.). It is noted that in FIG. 3, there are also plotted results of Resistance-Temperature measurement of the PTC element itself which has Tr of 125° C., and of the ceramic PTC element as a comparative example.

From FIG. 3, each of the present PTC device in Example 1 and the inorganic PTC element of the comparative example (which detects a temperature of 125° C.) has a threshold temperature (a temperature which may be referred to as a trip temperature, around which the resistance of the PTC element exponentially increases when the temperature of the PTC element increases from a room temperature) in the range from about 120° C. to 130° C., and the resistance value measured after tripping is at least about 106 times or more times greater than the resistance value before tripping as to each of the PTC elements. Therefore, each of the PTC device and the inorganic PTC element has a switching function as a PTC element. It is noted that in general, it may be understood that an element has the (switching) function as the PTC element when it has a resistance value after tripping at least about 103 or more times greater than the resistance value before tripping.

When the present PTC device that was subjected to the molding process is compared with the inorganic PTC element, it turns out that the present PTC device is greatly superior to the inorganic PTC element with regard to the increasing rate of the measured resistance value of after tripping to that of before tripping as well as the sharp increase of the resistance. That is, the present PTC device shows R-T properties which are substantially not different from those of the polymer PTC elements, which properties are apparently superior to those of the inorganic PTC elements.

FIG. 4 shows the results of R-T measurement of the PTC device in Example 5 (using the PTC element having Tr of 95° C.). It is noted that in FIG. 4, there are also plotted the results of R-T measurement of the PTC element itself, which has Tr of 95° C.

From FIG. 4, it turns out that each of the present PTC device (Example 5) and the PTC element to which no particular process has been done, has a threshold temperature around 95° C. at which the PTC device trips, and has sufficient tripping properties based on the matter that it showed an increase rate of the resistance value beyond 104 times or more times. That is, even in the case where the other potting materials such as a silicone resin are used in the device of the present invention, the PTC device of the present invention shows the R-T properties which are substantially not so different from those of the PTC elements, and such properties are sufficient to be used as the PTC elements.

FIG. 5 shows the results of R-T measurement of the PTC device in Example 6 (using a PTC element having Tr of 125° C.). It is noted that in FIG. 5, there are also plotted the results of R-T measurement of the PTC element itself which has Tr of 125° C. and the results of measurement of the present PTC device which was obtained by using the above PTC element.

From FIG. 5, it turns out that the PTC device of the present invention (Example 6) which has no potting element, has a threshold temperature of 125° C. around which the PTC device trips, as with the case of Example 1 which has the potting element. In addition, it is conceivable that the expansion of the PTC component is disturbed due to the matter that Example 6 has no potting element. Although the resistance value after tripping in Example 6 is as low as one half, or one quarter of that in Example 1, the increase rate of the resistance value is still beyond 104 times or more times, so that it turns out that it has sufficient tripping properties. Accordingly, even in the case where a potting element is omitted, the PTC device of the present invention shows the R-T properties which are substantially not so different from those of the PTC elements, and such properties are sufficient to be used as the PTC elements.

(2) Confirmation of Thermal-Response Properties of PTC Devices

A test of thermal-response properties of the PTC device about the PTC device of the present invention of Example 1 (which uses the PTC element having Tr of 125° C.) was performed by measuring a temperature and a resistance value of the PTC device in a condition where the ambient temperature of the PTC device was increased at a predetermined periodical rate.

Specifically, the device was fixed on a hotplate (EC-1200NP, manufactured by As One Corporation) using a heat-resistant tape such that the exposed surface of the layered support of the PTC device contacts with the hotplate and thermocouples (TC-K-H-0.1-1WP) were attached to the surface of the hotplate and the exposed surface of the layered support of the device, and then the temperature of the hotplate was raised from 20° C. to 160° C.

The resistance value of the PTC device and the temperature of the thermocouple were measured at a predetermined time interval during increasing the temperature. These measurements were performed using a Data Logger GR-3000 (available from KEYENCE CORPORATION), and the measurement are plotted versus time in FIG. 6. For comparison, the data about an inorganic PTC element (a mold type ceramic PTC element, PTFM04BB222Q2N34B0, manufactured by Murata Manufacturing Co., Ltd.) are shown in FIG. 7 when it was similarly heated on the hotplate.

Figure 6:
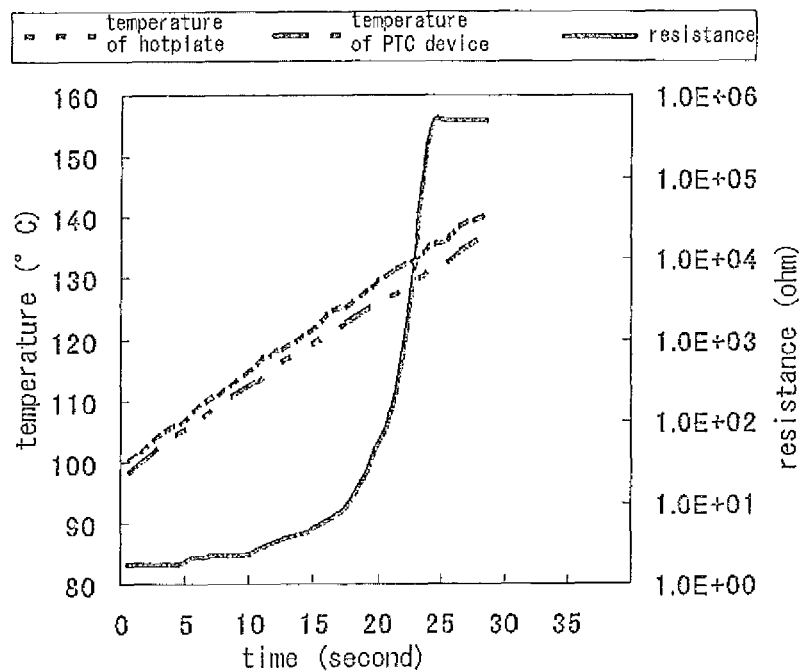
FIG. 6 shows transitions of a temperature of a thermocouple and the resistance value over time of the present PTC device in Example 1 when an ambient temperature was increased.

From the results of FIG. 6, it turns out that the present PTC device reaches the tripping state in 20 to 25 seconds during the period of about 25 seconds in which the temperature of the hotplate increased from 100° C. to 130° C.

Figure 7:
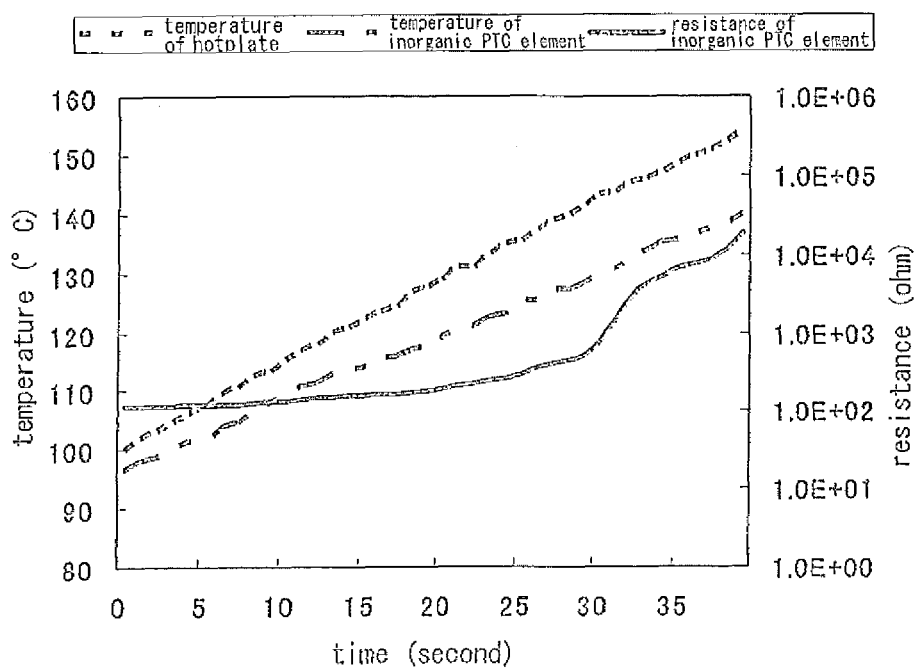
FIG. 7 shows transitions of a temperature of a thermocouple and the resistance value over time of an inorganic PTC element when an ambient temperature was increased.

From the results of FIG. 7, it turns out that as to the ceramic PTC device, the temperature of the PTC element hardly changed during the period of about 25 seconds in which the temperature of the hotplate similarly increased from 100° C. to 130° C. and started to slowly increase after 30 seconds passed, and thereafter the PTC element tripped.

From these results, compared with the inorganic PTC element, the PTC device of the present invention responds very quickly to the temperature change of the hotplate, which is an object for the detection and shows a steep increase of the resistance. Accordingly, it turns out that the PTC device of the present invention can detect more rapidly and more accurately a temperature of the object to be detected.

What is claimed is:

1. A PTC device comprising
   a layered support having first and second surfaces, such layered support functioning as a heat transfer medium,
   a polymer PTC element disposed on the first surface of the layered support, said PTC element having a trip temperature, and
   a potting element formed of a curable resin that coats the PTC element and has a coefficient of linear expansion,
   the polymer PTC element and the layered support being molded in a resin such that the second surface of the layered support is exposed and the potting element is between the PTC element and the molded resin, the coefficient of linear expansion of the potting element at the trip temperature of the PTC element being larger than that of the molded resin.

2. The PTC device according to claim 1 wherein the polymer PTC element is disposed on the first surface of the layered support in a thermally connected state.

3. A method of manufacturing a PTC device comprising a layered support and a polymer PTC element disposed thereon comprising the steps of:
   disposing the polymer PTC element having a trip temperature on a first surface of the layered support;
   surrounding the PTC element with a curable resin by means of potting it prior to molding,
   hardening the curable resin to form a potting element,
   subjecting the layered support and the polymer PTC element to molding such that a second surface of the layered support is exposed, and said potting element having a coefficient of linear expansion at the trip temperature of the PTC element larger than that of the molded resin.

4. An electrical device comprising a PTC device, said PTC device comprising
   a layered support having first and second surfaces, such layered support functioning as a heat transfer medium,
   a polymer PTC element disposed on the first surface of the layered support, said PTC element having a trip temperature, and
   a potting element formed of a curable resin having a coefficient of linear expansion,
   the polymer PTC element and the layered support being molded in a resin such that the second surface of the layered support is exposed and the potting element is between the PTC element and the molded resin, the coefficient of linear expansion of the potting element at the trip temperature of the PTC element being larger than that of the molded resin.

5. The PTC device according to claim 1, wherein the coefficient of linear expansion of the potting element is not less than $3.0 \times 10^{-5}/°$ C. and not more than $40.0 \times 10^{-5}/°$ C.

6. The PTC device according to claim 1, wherein the coefficient of linear expansion of the potting element is not more than $30.0 \times 10^{-5}/°$ C.

7. The PTC device according to claim 5, wherein the coefficient of linear expansion of the potting element is not more than $30.0 \times 10^{-5}/°$ C.

8. The method according to claim 3, wherein the polymer PTC element is directly or indirectly disposed on the layered support.

9. The electrical device of claim 4 wherein the polymer PTC element is disposed on the first surface of the layered support in a thermally connected state.

10. The method according to claim 3, wherein the curable resin to be used for potting has the coefficient of linear expansion not less than $3.0 \times 10^{-5}/°$ C. and not more than $40.0 \times 10^{-5}/°$ C.

11. The electrical device of claim 9 wherein the coefficient of linear expansion of the potting element is not less than $3.0 \times 10^{-5}/°$ C. and not more than $40.0 \times 10^{-5}/°$ C.

* * * * *